(12) United States Patent
Jeromin et al.

(10) Patent No.: US 11,261,642 B2
(45) Date of Patent: Mar. 1, 2022

(54) SYSTEM AND METHOD FOR TRACKING MOVING OBJECTS TO AVOID INTERFERENCE WITH VEHICULAR DOOR OPERATIONS

(71) Applicant: Faraday & Future Inc., Gardena, CA (US)

(72) Inventors: Oliver Max Jeromin, Torrance, CA (US); Hong S. Bae, Torrance, CA (US)

(73) Assignee: Faraday & Future Inc., Gardena, CA (US)

( * ) Notice: Subject to any disclaimer, the term of this patent is extended or adjusted under 35 U.S.C. 154(b) by 202 days.

(21) Appl. No.: 16/073,761

(22) PCT Filed: Jan. 24, 2017

(86) PCT No.: PCT/US2017/014738
§ 371 (c)(1),
(2) Date: Jul. 27, 2018

(87) PCT Pub. No.: WO2017/132143
PCT Pub. Date: Aug. 3, 2017

(65) Prior Publication Data
US 2019/0024430 A1  Jan. 24, 2019

Related U.S. Application Data

(60) Provisional application No. 62/288,835, filed on Jan. 29, 2016.

(51) Int. Cl.
*E05F 15/40* (2015.01)
*G06K 9/00* (2006.01)
(Continued)

(52) U.S. Cl.
CPC .......... *E05F 15/40* (2015.01); *G06K 9/00805* (2013.01); *E05F 2015/434* (2015.01);
(Continued)

(58) Field of Classification Search
CPC . E05F 15/40; E05F 2015/434; G06K 9/00805
See application file for complete search history.

(56) References Cited

U.S. PATENT DOCUMENTS 8,615,109 B2   12/2013  Shimizu
2005/0280518 A1*  12/2005  Bartels .................. B60Q 9/008
                                                              340/435
(Continued)

FOREIGN PATENT DOCUMENTS

EP   2543544 A1   1/2013

OTHER PUBLICATIONS

International Search Report dated May 26, 2017 for International Application No. PCT/US2017/014738.

*Primary Examiner* — Ruiping Li
(74) *Attorney, Agent, or Firm* — Veros Legal Solutions LLP

(57) ABSTRACT

A system that performs a method is disclosed. Image data from a first camera mounted on a vehicle is received, the vehicle including a first element configured to open into a first space external to the vehicle, and the image data indicative of motion of a first object during a first time period, the first object located outside of the first space. Whether the motion of the first object during the first time period indicates that the first object will interfere with operation of the first element during a second time period, after the first time period, is determined. In accordance with a determination that the motion of the first object indicates that the first object will interfere with the operation of the first element during the second time period, an action that avoids the interference is performed.

18 Claims, 4 Drawing Sheets

(51) Int. Cl.
*E05F 15/43* (2015.01)
*E05F 15/73* (2015.01)

(52) U.S. Cl.
CPC ..... *E05F 2015/767* (2015.01); *E05Y 2400/40* (2013.01); *E05Y 2900/531* (2013.01)

(56) References Cited

U.S. PATENT DOCUMENTS

| | | | |
|---|---|---|---|
| 2008/0061999 | A1 | 3/2008 | Birk et al. |
| 2009/0000196 | A1 | 1/2009 | Kollar et al. |
| 2014/0049647 | A1* | 2/2014 | Ick ....................... G06K 9/6267 348/148 |

* cited by examiner

SYSTEM AND METHOD FOR TRACKING MOVING OBJECTS TO AVOID INTERFERENCE WITH VEHICULAR DOOR OPERATIONS

CROSS-REFERENCE TO RELATED APPLICATION

This application is a National Phase application under 35 U.S.C. § 371 of International Application No. PCT/US2017/014738, filed Jan. 24, 2017, which claims priority to U.S. Provisional Application No. 62/288,835, filed Jan. 29, 2016. The subject matter of each of the aforementioned applications is hereby incorporated by reference in its entirety for all purposes.

FIELD OF THE DISCLOSURE

This relates generally to object detection, and more particularly, to a system and method for tracking moving objects using one or more cameras on a vehicle to determine whether the objects will interfere with vehicle door operation.

BACKGROUND OF THE DISCLOSURE

Modern vehicles, especially automobiles, increasingly include various sensors for detecting and gathering information about the vehicles' surroundings. These sensors may include ultrasonic sensors for detecting the proximity of a vehicle to objects in the vehicle's surroundings, and may be used to provide information about the current locations of the objects with respect to the vehicle. However, some objects that may interfere with vehicle operation (e.g., the opening of vehicle doors) may be moving objects that, while not currently interfering with vehicle operation, may interfere with vehicle operation in the future. Current object detection techniques may not account for such future interference.

SUMMARY OF THE DISCLOSURE

Examples of the disclosure are directed to using one or more sensors (e.g., cameras) to detect the movements of objects in a vehicle's surroundings. In some examples, based on those movements, the vehicle can estimate trajectories for those objects, and determine whether those objects will interfere with the operation of vehicle doors in the future (e.g., the opening of the vehicle doors, the remaining open of the vehicle doors without colliding with an object, etc.). If future interference is determined, the vehicle can take appropriate action to avoid the interference, such as alerting a driver or a passenger of the potential interference by playing a sound through one or more speakers in the vehicle, causing one or more lights inside the vehicle to flash, displaying a visual indication on one or more display screens inside the vehicle, and/or providing vibration to the steering wheel of the vehicle or the driver's seat of the vehicle. In some examples, the vehicle can additionally or alternatively begin to automatically close the door(s) in danger of being obstructed (if the door(s) are already open), prevent the opening of the door(s) in danger of being obstructed (if the door(s) are not yet open), and/or provide an alert to the object (in case the object is a person or controlled by a person) in an effort to alert the person of the potential collision.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some vehicles, such as automobiles, may include ultrasonic sensors for detecting the proximity of the vehicles to objects in the vehicles' surroundings. These sensors may be used to provide information about the current locations of the objects with respect to the vehicle. However, some objects that may interfere with vehicle operation (e.g., the opening of vehicle doors) may be moving objects that, while not currently interfering with vehicle operation, may interfere with vehicle operation in the future. Examples of the disclosure are directed to using one or more sensors (e.g., cameras) to detect the movements of objects in a vehicle's surroundings. In some examples, based on those movements, the vehicle can estimate trajectories for those objects, and determine whether those objects will interfere with the operation of vehicle doors in the future (e.g., the opening of the vehicle doors, the remaining open of the vehicle doors without colliding with an object, etc.). If future interference is determined, the vehicle can take appropriate action to avoid the interference, such as alerting a driver or a passenger of the potential interference by playing a sound through one or more speakers in the vehicle, causing one or more lights inside the vehicle to flash, displaying a visual indication on one or more display screens inside the vehicle, and/or providing vibration to the steering wheel of the vehicle or the driver's seat of the vehicle. In some examples, the vehicle can additionally or alternatively begin to automatically close the door(s) in danger of being hit (if the door(s) are already open), prevent the opening of the door(s) in danger of being hit (if the door(s) are not yet open), and/or provide an alert to the object (in case the object is a person or controlled by a person) in an effort to alert the person of the potential collision.

Figure 1:
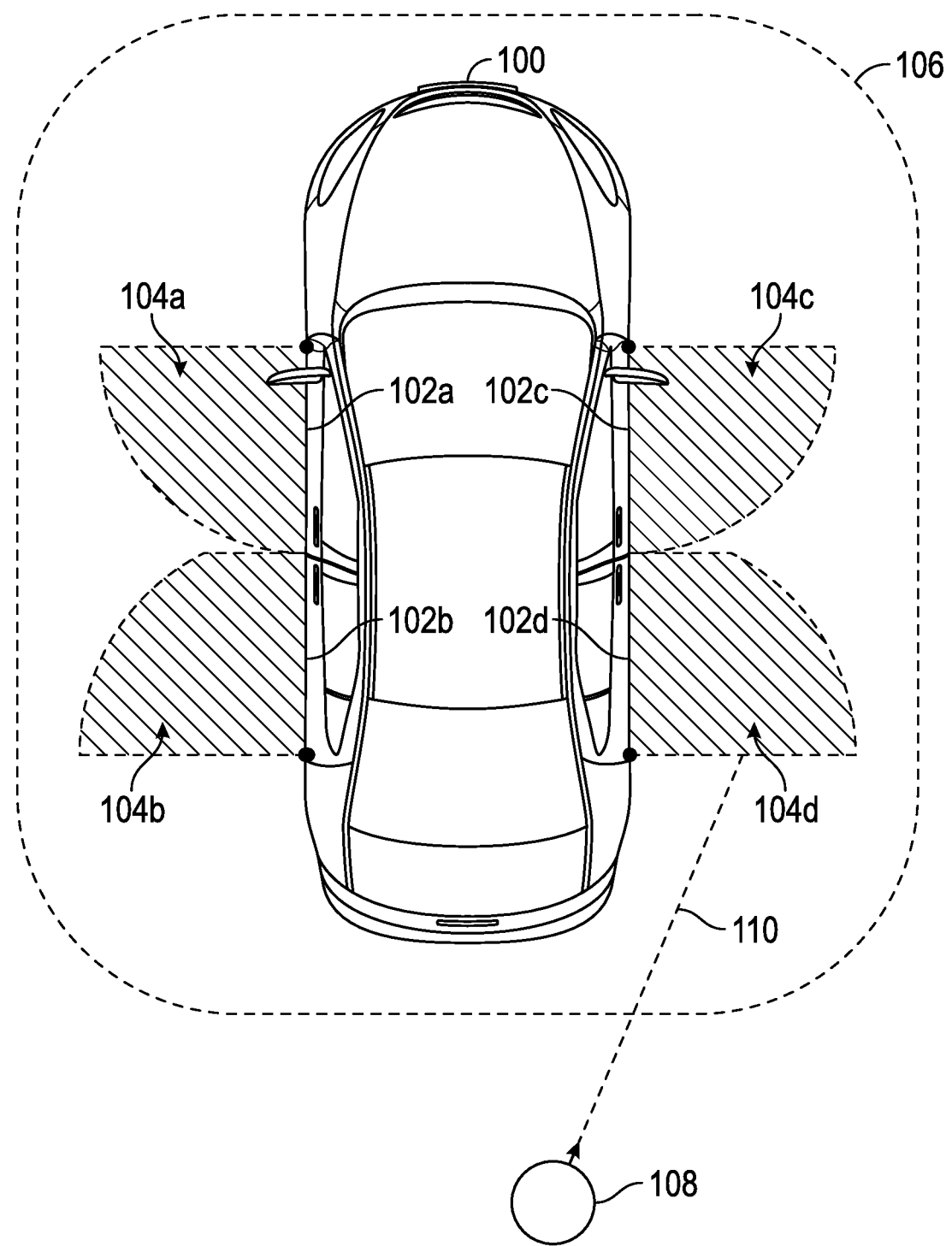
FIG. 1 illustrates an exemplary vehicle having doors according to examples of the disclosure.

FIG. 1 illustrates exemplary vehicle 100 having doors 102 according to examples of the disclosure. In some examples, doors 102a, 102b, 102c and 102d (referred to collectively as 102) can be at least partially automated. For example, one or more of doors 102 can open automatically in response to a user input (e.g., button press) in vehicle 100. Doors 102 can open into interaction spaces 104 external to vehicle 100. Though doors 102 are described as being at least partially automated, the examples of the disclosure can additionally be applied to doors that are not automated at all or in the same way. Further, though vehicle 100 is described as having four doors, vehicles with fewer than or more than four doors are also within the scope of the disclosure.

In some examples, vehicle 100 can include one or more sensors (e.g., ultrasonic sensors, LIDAR sensors, cameras, etc., not illustrated) for detecting the presence of objects in an area proximate to the vehicle. This proximal area can be represented as area 106 in FIG. 1. In some examples, vehicle 100 can sense the presence of objects within area 106 when one or more of doors 102 are opened. If an object is within the interaction space(s) 104 of the door(s) 102 being opened, vehicle 100 can alert the driver, slow or stop the opening of the door(s), or a number of other actions to try to prevent the door(s) from colliding with the object.

However, some or all of the objects that may interfere with the opening of doors 102 may not be stationary objects, but rather moving objects. As such, it can be beneficial for vehicle 100 to track the movements of objects—not only their positions—and estimate their trajectories to determine whether their estimated trajectories will interfere with doors 102 in any way; for example, whether the objects will interfere with the opening of doors 102, whether the objects will collide with doors 102 while they are open, etc. Further, it can be beneficial for vehicle 100 to be able to track the movements of objects, not only inside area 106, but also outside of area 106, because objects outside of area 106 can also interfere with doors 102 by eventually moving into interaction spaces 104. For example, object 108, despite being outside of area 106, can be moving towards door 102d and interaction space 104d along trajectory 110, potentially interfering with the opening of door 102d, or, if door 102d is already open, potentially colliding with door 102d. If vehicle 100 is able to track object 108 and its movement, and determine trajectory 110, the vehicle can determine whether object 108 may interfere with the operation of doors 102. The examples of the disclosure will be described in the context of doors, though it is understood that the examples of the disclosure can be implemented in the context of any element on vehicle 102 that can open into a space external to the vehicle, such as hoods, trunk lids, windows, gas cap access covers, side view mirrors, etc.

Figure 2:
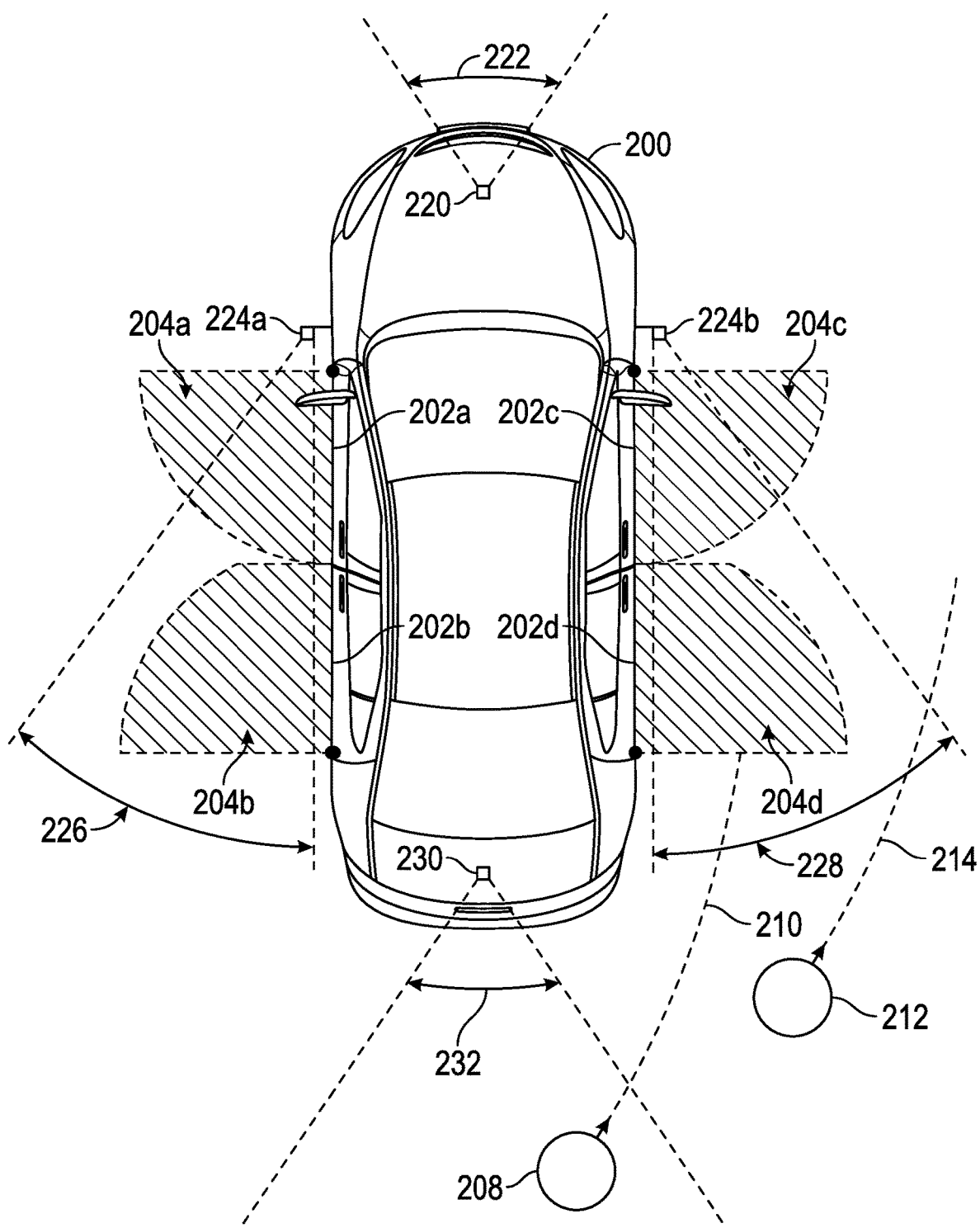
FIG. 2 illustrates an exemplary vehicle having cameras for tracking the movements of objects and determining object trajectories according to examples of the disclosure.

FIG. 2 illustrates exemplary vehicle 200 having cameras 220, 224 and 230 for tracking the movements of objects and determining object trajectories according to examples of the disclosure. Vehicle 200 can have doors 202 that can open into interaction spaces 204, as described with reference to FIG. 1. Vehicle 200 can, though not necessarily, include one or more sensors for detecting objects within a proximity of the vehicle (e.g., within region 106 of vehicle 100 in FIG. 1), though they are not illustrated for simplicity.

To facilitate tracking the movements of objects and determining object trajectories, vehicle can include cameras 220, 224a and 224b (referred to collectively as 224) and 230. Though four cameras are illustrated in FIG. 2, it is understood that vehicle 200 can include fewer or more than four cameras in implementing the examples of the disclosure. Further, though vehicle 200 is described as including cameras for the purpose of tracking the movements of objects and determining object trajectories, additional or alternative sensors can be used for this purpose; for example, ultrasonic sensors, LIDAR sensors, etc., can additionally or alternatively be used.

Camera 220 can be substantially forward-facing, and can have field of view 222—thus, camera 220 can track objects substantially in front of vehicle 200. Cameras 224 can be substantially rear-facing, and can have fields of view 226 and 228 that can, though not necessarily, at least partially include interaction spaces 204 into which doors 202 open—thus, cameras 224 can track objects substantially beside and behind vehicle 200 on both the left and the right. In some examples, in addition to being used to track objects, camera 224a can be used as a replacement for a traditional left side-view mirror on vehicle 200, and camera 224b can be used as a replacement for a traditional right side-view mirror on the vehicle. Camera 230 can be substantially rear-facing, and can have field of view 232—thus, camera 230 can track objects substantially behind vehicle 200. In some examples, in addition to being used to track objects, camera 230 can be used as a replacement for a traditional rear-view mirror on vehicle 200.

Using one or more of cameras 220, 224 and 230, vehicle 200 can track the movements of objects, and determine whether the objects might interfere with the operation of one or more of doors 202. For example, based on images captured by camera 230, vehicle 200 can identify the current position of object 208, and based on the current position and past positions of object 208 stored by the vehicle, determine estimated trajectory 210 of object 208. This determination of trajectory 210 can be performed using any number of appropriate movement extrapolation techniques. Trajectory 210 can indicate that object 208 is moving towards, and will eventually move into, interaction space 204d of door 202d. As such, vehicle 200 can take appropriate action, as previously described, to avoid the interference of object 208 with the operation of door 202d. For example, vehicle 200 can alert (e.g., an audio alert, a visual alert, a tactile alert, etc.) a driver or passenger of the vehicle of the potential collision, so that the driver or passenger can take action to rectify the situation. In some examples, the alert may include vehicle 200 playing a sound through one or more speakers in the vehicle, causing one or more lights inside the vehicle to flash, displaying a visual indication on one or more display screens (e.g., liquid crystal displays, organic light emitting diode displays, etc.) inside the vehicle and/or providing vibration to the steering wheel of the vehicle or the driver's seat of the vehicle. Additionally or alternatively, vehicle 200 can begin to automatically close the door(s) in danger of being hit (if the door(s) are already open), or can prevent the opening of the door(s) in danger of being hit (if the door(s) are not yet open). Vehicle 200 can additionally or alternatively provide an alert to the object (in case the object is a person or controlled by a person) in an effort to alert the person of the potential collision. For example, a lighting strip included in doors 202 (in some examples, only the door with which the object will interfere) be illuminated to make the doors more noticeable to those outside of vehicle 200.

Similarly, based on images captured by camera 224b, vehicle 200 can identify the current position of object 212 relative to the vehicle, and based on the current position and past positions of object 212 stored by the vehicle, determine estimated trajectory 214 of object 212. Trajectory 214 can indicate that object 212 is not moving towards interaction spaces 204c or 204d of doors 202c and 202d, respectively (or any other interaction spaces of other doors of vehicle 200). As such, vehicle 200 can determine that object 212 will likely not interfere with the opening of doors 202c and 202d (or any other doors of the vehicle), and can forgo providing an alert to that effect. In some examples, vehicle 200 can begin tracking the movements of one or more objects using a first camera, and can transition to tracking the movements of the one or more objects using a second camera, as appropriate (e.g., transitioning from using camera 230 to using camera 224b to track the movement of object 208 as it moves from field of view 232 to field of view 228 towards interaction space 204d). Exemplary techniques for tracking objects using a camera are described in BenAbdelkader, C., Burlina, P., & Davis, L. (2000), "Single camera multiplexing for multi-target tracking," Multimedia Video-Based Surveillance Systems (pp. 130-142), Springer US, the contents of which is hereby incorporated by reference for all purposes.

It is understood that the object-door interference determinations of the disclosure can be performed before door(s) 202 are opened, while the door(s) are opening and/or while the door(s) are open. Thus, for example, while one or more of doors 202 are open, vehicle 200 can track the movement of objects using cameras 220, 224 and/or 230, and if the vehicle determines that an object will collide with one or more of the doors, the vehicle can take appropriate action to avoid such collision. For example, the vehicle can alert (e.g., with an audible, visual, tactile, etc., alert) a driver or passenger of vehicle 200 of the potential collision, so that the driver or passenger can take action to rectify the situation. Additionally or alternatively, vehicle 200 can stop/pause the operations of or begin to automatically close the door(s) in danger of being hit, and/or provide an alert to the object (in case the object is a person or controlled by a person) in an effort to alert the person of the potential collision. For example, a lighting strip included in doors 202 (in some examples, only the door with which the object will collide) can be illuminated to make the doors more noticeable to those outside of vehicle 200. If one or more of doors 202 are opening when vehicle 200 determines that an object will interfere with the one or more doors, the vehicle can alert a driver or passenger of the vehicle of the potential interference, prevent the one or more doors from opening further, and/or automatically begin closing the one or more doors.

In each of the examples disclosed above, vehicle 200 can continuously track the movements of objects around the vehicle. As a result, if, after determining that an object will interfere with the operation of one or more of doors 202, the object's movement changes such that its trajectory, determined by vehicle 200, no longer indicates that it will interfere with the one or more doors, the vehicle can cancel and/or reverse any action that it took previously to avoid the interference. For example, if vehicle 200 had previously provided an alert to a driver or passenger of the vehicle, the vehicle can cease providing the alert. Similarly, if vehicle 200 had previously started closing one or more of doors 202, the vehicle can stop closing the one or more doors and/or can begin automatically re-opening the one or more doors to their original positions. As another example, if vehicle 200 had previously prevented the opening of one or more of doors 202, the vehicle can permit the opening of the one or more doors and/or begin automatically opening the one or more doors. Other cancellations or reversals of actions previously taken by vehicle 200 can analogously be executed.

Figure 3:
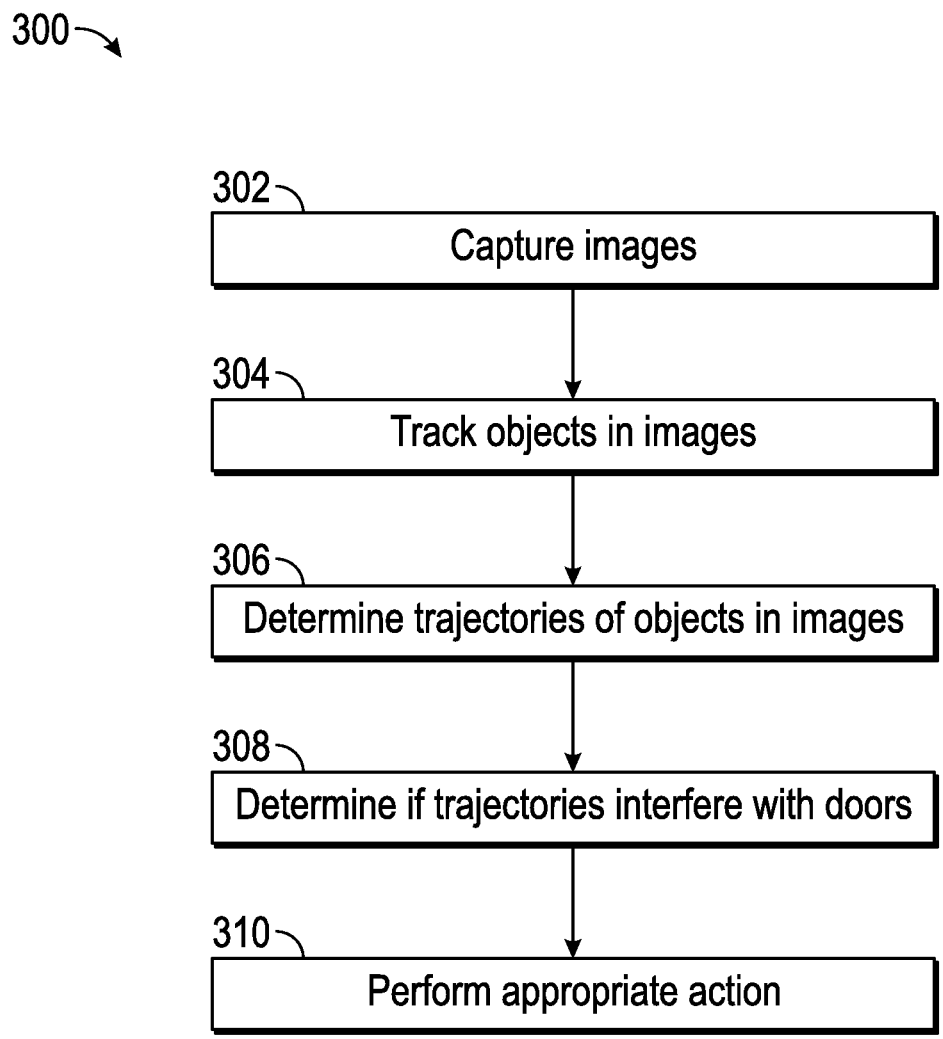
FIG. 3 illustrates an exemplary process for tracking objects to avoid interference with vehicle doors according to examples of the disclosure.

FIG. 3 illustrates exemplary process 300 for tracking objects to avoid interference with vehicle doors according to examples of the disclosure. Process 300 can be performed at any time, such as before the vehicle doors are opened, while the vehicle doors are opening and/or while the vehicle doors are open. At 302, one or more images of the surroundings of a vehicle can be received. The one or more images can be captured by one or more cameras mounted on the vehicle (e.g., as described with reference to FIG. 2).

At step 304, objects in the one or more images can be identified and tracked over time. For example, the vehicle can determine that one or more objects exist in the one or more images, and can track the positions of those objects over time (e.g., as described with reference to FIG. 2). In some examples, object tracking at 304 can be performed continuously, such that object tracking can continue even after steps 306, 308 and 310 of process 300 (described below) are performed.

At step 306, the vehicle can determine estimated trajectories for the objects in the one or more images (e.g., as described with reference to FIG. 2). These determinations can be performed using any appropriate trajectory determination techniques, such as various predictive filtering techniques. In some examples, estimated trajectory determinations at 306 can be performed continuously, such that estimated trajectory determinations can continue even after steps 308 and 310 of process 300 (described below) are performed, and such that estimated trajectories associated with objects can change as movements of the objects change.

At step 308, the vehicle can determine whether the trajectories determined at 306 indicate potential object interference with the operation of one or more doors on the vehicle (e.g., as described with reference to FIG. 2). For example, the vehicle can determine whether the trajectory of an object in the one or more images intersects with the interaction space into which a vehicle door will open, is opening or has opened. If so, the vehicle can determine that the object will interfere with the operation (e.g., the opening or remaining open) of that door. In some examples, the vehicle may determine that an object will not interfere with the operation of a door, despite the estimated trajectory of that object intersecting with the door's interaction space, if the vehicle determines that the object will not reach the door's interaction space for longer than a threshold period of time (e.g., based on the speed of movement of the object). This threshold period of time can be the time it takes for the door to open fully if the door is currently closed, for example, and can be stored as a predetermined period of time in a memory in the vehicle. Alternatively, this threshold period of time can be the time it takes for the door to open fully, a person to enter or exit the vehicle through the door, and the door to close fully, if the door is currently closed, for example—this threshold period of time can also be stored as a predetermined period of time in a memory in the vehicle. In some examples, this threshold period of time can be the time it takes for the door to close fully if the door is currently open, for example. It is understood that any appropriate threshold period of time can be used in accordance with the examples of the disclosure. Further, in some examples, interference determinations at 308 can be performed continuously, such that interference determinations can continue even after step 310 of process 300 (described below) is performed, and such that interference determinations associated with objects can change as movements and/or trajectories of the objects change.

At step 310, if the vehicle determines at 308 that one or more objects will interfere with the operation of one or more doors on the vehicle, then the vehicle can take appropriate action to attempt to avoid such interference, as described above with respect to FIG. 2. If the vehicle is set in an autonomous driving mode, at 310, the vehicle can additionally or alternatively automatically move (e.g., by automatically disengaging the vehicle's brakes, engaging the vehicle's drive motor, and adjusting the steering angle to move at a calculated speed and direction) to a new location at which the one or more objects will no longer interfere with the operation of the vehicle's doors. In some examples, the vehicle can utilize dynamically obtained GPS data from a GPS service to automatically determine the new location to which to move, and/or data from other sensors on the vehicle to determine an available location and/or a driving path to that location. Additionally, in some examples, step 310 can include canceling or reversing an action previously performed by the vehicle due to changes in object movements or trajectories, as previously described.

Figure 4:
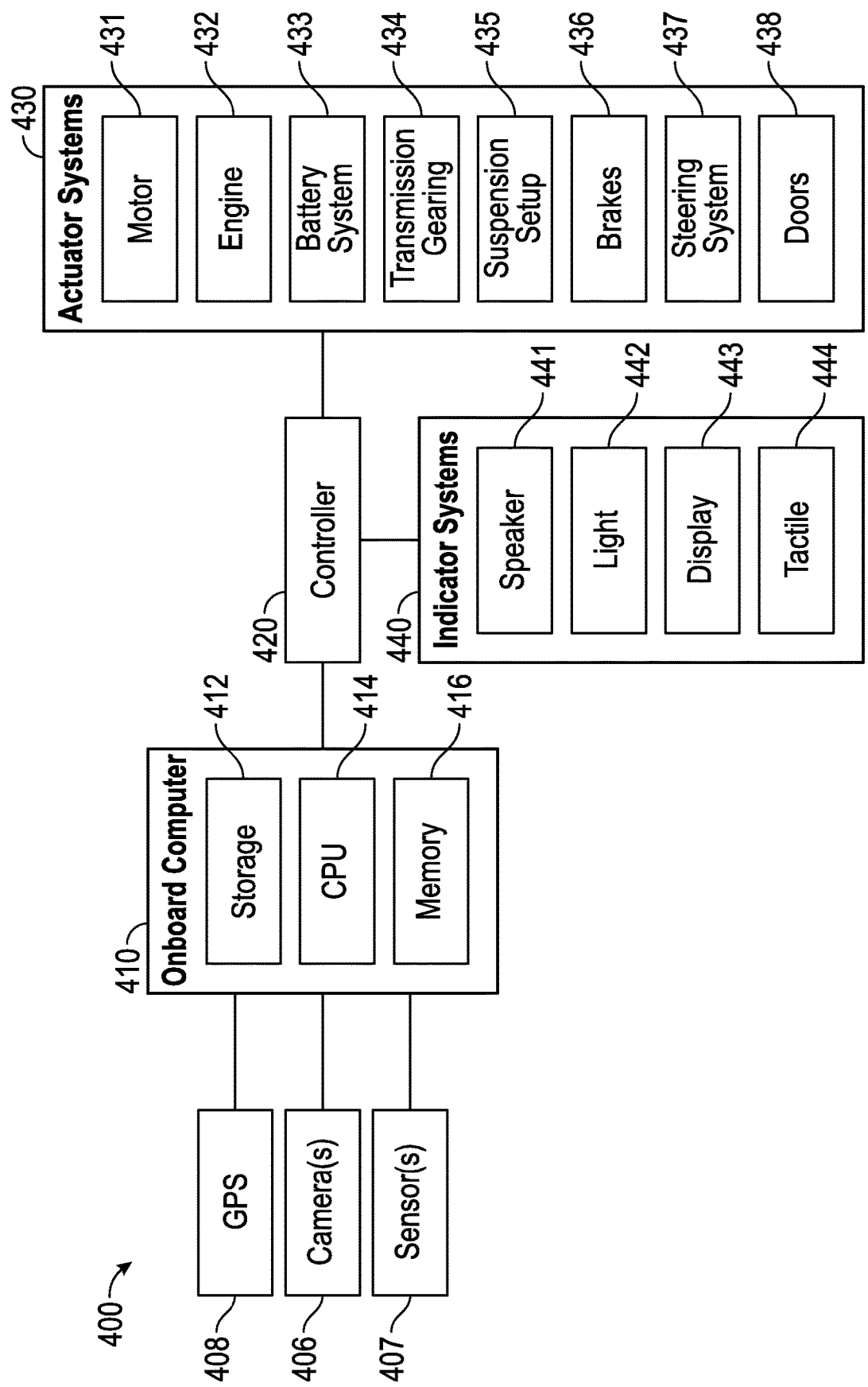
FIG. 4 illustrates an exemplary system block diagram of a vehicle control system according to examples of the disclosure.

FIG. 4 illustrates an exemplary system block diagram of vehicle control system 400 according to examples of the disclosure. Vehicle control system 400 can perform any of the methods described with reference to FIGS. 2-3. System 400 can be incorporated into a vehicle, such as a consumer automobile. Other example vehicles that may incorporate the system 400 include, without limitation, airplanes, boats, or industrial automobiles. Vehicle control system 400 can include one or more cameras 406 capable of capturing image data (e.g., video data), as previously described with respect to FIGS. 2-3. Vehicle control system 400 can also include one or more other sensors 407 (e.g., radar, ultrasonic, etc.) capable of detecting objects in the vehicle's surroundings, and a Global Positioning System (GPS) receiver 408 capable of determining the location of the vehicle. Vehicle control system 400 can include an on-board computer 410 that is coupled to the cameras 406, sensors 407 and GPS receiver 408, and that is capable of receiving the image data from the camera and/or outputs from the sensors 407 and the GPS receiver 408. The on-board computer 410 can be capable of tracking the movement of one or more objects and determining whether the one or more objects will interfere with the operation of one or more vehicle doors, as described in this disclosure. On-board computer 410 can include storage 412, memory 416, and a processor 414. Processor 414 can perform any of the methods described with reference to FIGS. 2-3. Additionally, storage 412 and/or memory 416 can store data and instructions for performing any of the methods described with reference to FIGS. 2-3. Storage 412 and/or memory 416 can be any non-transitory computer readable storage medium, such as a solid-state drive or a hard disk drive, among other possibilities. The vehicle control system 400 can also include a controller 420 capable of controlling one or more aspects of vehicle operation, such as providing an alert to a driver or passenger, controlling the states of one or more vehicle doors, and moving the vehicle, based on the determinations of the on-board computer 410.

In some examples, the vehicle control system 400 can be connected to (e.g., via controller 420) one or more actuator systems 430 in the vehicle and one or more indicator systems 440 in the vehicle. The one or more actuator systems 430 can include, but are not limited to, a motor 431 or engine 432, battery system 433, transmission gearing 434, suspension setup 435, brakes 436, steering system 437 and door system 438. The vehicle control system 400 can control, via controller 420, one or more of these actuator systems 430 during vehicle operation; for example, to open or close one or more of the doors of the vehicle using the door actuator system 438, or to move the vehicle using the motor 431 or engine 432, battery system 433, transmission gearing 434, suspension setup 435, brakes 436 and/or steering system 437. The one or more indicator systems 440 can include, but are not limited to, one or more speakers 441 in the vehicle (e.g., as part of an entertainment system in the vehicle), one or more lights 442 in the vehicle (e.g., built into the doors of the vehicle), one or more displays 443 in the vehicle (e.g., as part of a control or entertainment system in the vehicle) and one or more tactile actuators 444 in the vehicle (e.g., as part of a steering wheel or seat in the vehicle). The vehicle control system 400 can control, via controller 420, one or more of these indicator systems 440 to provide indications to the driver of a potential object interfering with the operation of the vehicle doors. This can be done as described with reference to FIGS. 2-3, for example.

Thus, the examples of the disclosure provide various ways to prevent moving objects from interfering with vehicle door operation.

Therefore, according to the above, some examples of the disclosure are directed to a system comprising: one or more processors; and a memory including instructions, which when executed by the one or more processors, cause the one or more processors to perform a method comprising: receiving image data from a first camera mounted on a vehicle, the vehicle including a first element configured to open into a first space external to the vehicle, and the image data indicative of motion of a first object during a first time period, the first object located outside of the first space; determining whether the motion of the first object during the first time period indicates that the first object will interfere with operation of the first element during a second time period, after the first time period; and in accordance with a determination that the motion of the first object indicates that the first object will interfere with the operation of the first element during the second time period, performing an action that avoids the interference. Additionally or alternatively to one or more of the examples disclosed above, in some examples, the first element comprises a door configured to open into an interaction space external to the vehicle. Additionally or alternatively to one or more of the examples disclosed above, in some examples, during the first time period, the first element is open, interfering with the operation of the first element comprises colliding with the first element while the first element is open. Additionally or alternatively to one or more of the examples disclosed above, in some examples, during the first time period, the first element is closed, and interfering with the operation of the first element comprises preventing the first element from opening without colliding with the first object. Additionally or alternatively to one or more of the examples disclosed above, in some examples, determining whether the motion of the first object during the first time period indicates that the first object will interfere with the operation of the first element during the second time period comprises: determining an estimated trajectory of the first object during the first time period; in accordance with a determination that the estimated trajectory of the first object indicates that the first object will reach the first space during the second time period, determining that the first object will interfere with the operation of the first element; and in accordance with a determination that the estimated trajectory of the first object indicates that the first object will not reach the first space, determining that the first object will not interfere with the operation of the first element. Additionally or alternatively to one or more of the examples disclosed above, in some examples, determining whether the motion of the first object during the first time period indicates that the first object will interfere with the operation of the first element during the second time period comprises: in accordance with a determination that the second time period is greater than a predetermined threshold time after the first time period, forgoing determining that the first object will interfere with the operation of the first element. Additionally or alternatively to one or more of the examples disclosed above, in some examples, the first camera is additionally used as a side-view mirror replacement. Additionally or alternatively to one or more of the examples disclosed above, in some examples, the first camera is substantially forward-facing on the vehicle. Additionally or alternatively to one or more of the examples disclosed above, in some examples, the first camera is additionally used as a rear-view mirror replacement. Additionally or alternatively to one or more of the examples disclosed above, in some examples, the action comprises automatically closing the first element. Additionally or alternatively to one or more of the examples disclosed above, in some examples, the action comprises automatically preventing the opening of the first element. Additionally or alternatively to one or more of the examples disclosed above, in some examples, the action comprises automatically moving the vehicle to a new location, the new location based on the motion of the first object during the first time period, and data from a GPS receiver indicative of a current location of the vehicle. Additionally or alternatively to one or more of the examples disclosed above, in some examples, the action comprises providing an alert to a driver or a passenger of the vehicle. Additionally or alternatively to one or more of the examples disclosed above, in some examples, the action comprises providing an alert to the first object. Additionally or alternatively to one or more of the examples disclosed above, in some examples, the method further comprises: after the first time period, determining that the first object will no longer interfere with the operation of the first element; and in response to determining that the first object will no longer interfere with the operation of the first element, canceling the action. Additionally or alternatively to one or more of the examples disclosed above, in some examples, the method further comprises: after the first time period, determining that the first object will no longer interfere with the operation of the first element; and in response to determining that the first object will no longer interfere with the operation of the first element, reversing the action. Additionally or alternatively to one or more of the examples disclosed above, in some examples, the vehicle includes a second element, different from the first element, configured to open into a second space external to the vehicle, different from the first space, determining that the motion of the first object indicates that the first object will interfere with the operation of the first element comprises determining that the motion of the first object indicates that the first object will not interfere with the operation of the second element, and performing the action comprises performing the action with respect to the first element but not the second element. Additionally or alternatively to one or more of the examples disclosed above, in some examples, the method further comprises receiving image data indicative of motion of a second object during the first time period, the second object located outside of the second space, the vehicle includes a second element, different from the first element, configured to open into a second space external to the vehicle, different from the first space, and performing the action comprises, in accordance with a determination that the second object will interfere with operation of the second element during a third time period, after the first time period: performing a first action with respect to the first element that avoids the interference of the first object with the operation of the first element; and performing a second action, different from the first action, with respect to the second element that avoids the interference of the second object with the operation of the second element.

Some examples of the disclosure are directed to a non-transitory computer-readable medium including instructions, which when executed by one or more processors, cause the one or more processors to perform a method comprising: receiving image data from a first camera mounted on a vehicle, the vehicle including a first element configured to open into a first space external to the vehicle, and the image data indicative of motion of a first object during a first time period, the first object located outside of the first space; determining whether the motion of the first object during the first time period indicates that the first object will interfere with operation of the first element during a second time period, after the first time period; and in accordance with a determination that the motion of the first object indicates that the first object will interfere with the operation of the first element during the second time period, performing an action that avoids the interference.

Some examples of the disclosure are directed to a vehicle comprising: a first camera; one or more processors coupled to the first camera; a door actuator coupled to the one or more processors; a first element configured to open, using the door actuator, into a first space external to the vehicle; and a memory including instructions, which when executed by the one or more processors, cause the one or more processors to perform a method comprising: receiving image data from the first camera, the image data indicative of motion of a first object during a first time period, the first object located outside of the first space; determining whether the motion of the first object during the first time period indicates that the first object will interfere with operation of the first element during a second time period, after the first time period; and in accordance with a determination that the motion of the first object indicates that the first object will interfere with the operation of the first element during the second time period, performing an action that avoids the interference.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
one or more processors; and
a memory including instructions, which when executed by the one or more processors, cause the one or more processors to perform a method comprising the steps of:
receiving image data from a first camera of a vehicle, the vehicle including a first element configured to open into a first space external to the vehicle, and the image data indicative of motion of a first object during a first time period, the first object located outside of the first space;
determining whether the motion of the first object during the first time period indicates that the first object will interfere with operation of the first element during a second time period, after the first time period; and
in accordance with a determination that the motion of the first object indicates that the first object will interfere with the operation of the first element during the second time period, performing an action that avoids the interference;
wherein determining whether the motion of the first object during the first time period indicates that the first object will interfere with the operation of the first element during the second time period comprises:
determining an estimated trajectory of the first object during the first time period;
in accordance with a determination that the estimated trajectory of the first object indicates that the first object will reach the first space during the second time period, determining that the first object will interfere with the operation of the first element;

in accordance with a determination that the estimated trajectory of the first object indicates that the first object will not reach the first space, determining that the first object will not interfere with the operation of the first element; and in accordance with a determination that the second time period is greater than a predetermined threshold time after the first time period, forgoing determining that the first object will interfere with the operation of the first element.

2. The system of claim 1, wherein the first element comprises a door configured to open into an interaction space external to the vehicle.

3. The system of claim 1, wherein: during the first time period, the first element is open, interfering with the operation of the first element comprises colliding with the first element while the first element is open.

4. The system of claim 1, wherein: during the first time period, the first element is closed, and interfering with the operation of the first element comprises preventing the first element from opening without colliding with the first object.

5. The system of claim 1, wherein the first camera is additionally used as a side-view mirror replacement.

6. The system of claim 1, wherein the first camera is substantially forward-facing on the vehicle.

7. The system of claim 1, wherein the first camera is additionally used as a rear-view mirror replacement.

8. The system of claim 1, wherein the action comprises automatically closing the first element.

9. The system of claim 1, wherein the action comprises automatically preventing the opening of the first element.

10. The system of claim 1, wherein the action comprises automatically moving the vehicle to a new location, the new location based on the motion of the first object during the first time period, and data from a GPS receiver indicative of a current location of the vehicle.

11. The system of claim 1, wherein the action comprises providing an alert to a driver or a passenger of the vehicle.

12. The system of claim 1, wherein the action comprises providing an alert to the first object.

13. The system of claim 1, wherein the method further comprises: after the first time period, determining that the first object will no longer interfere with the operation of the first element; and in response to determining that the first object will no longer interfere with the operation of the first element, canceling the action.

14. The system of claim 1, wherein the method further comprises: after the first time period, determining that the first object will no longer interfere with the operation of the first element; and in response to determining that the first object will no longer interfere with the operation of the first element, reversing the action.

15. The system of claim 1, wherein: the vehicle includes a second element, different from the first element, configured to open into a second space external to the vehicle, different from the first space, determining that the motion of the first object indicates that the first object will interfere with the operation of the first element comprises determining that the motion of the first object indicates that the first object will not interfere with the operation of the second element, and performing the action comprises performing the action with respect to the first element but not the second element.

16. The system of claim 1, wherein: the method further comprises receiving image data indicative of motion of a second object during the first time period, the second object located outside of the second space, the vehicle includes a second element, different from the first element, configured to open into a second space external to the vehicle, different from the first space, and performing the action comprises, in accordance with a determination that the second object will interfere with operation of the second element during a third time period, after the first time period: performing a first action with respect to the first element that avoids the interference of the first object with the operation of the first element; and performing a second action, different from the first action, with respect to the second element that avoids the interference of the second object with the operation of the second element.

17. A non-transitory computer-readable medium including instructions, which when executed by one or more processors, cause the one or more processors to perform a method comprising the steps of:

receiving image data from a first camera of a vehicle, the vehicle including a first element configured to open into a first space external to the vehicle, and the image data indicative of motion of a first object during a first time period, the first object located outside of the first space;

determining whether the motion of the first object during the first time period indicates that the first object will interfere with operation of the first element during a second time period, after the first time period; and in accordance with a determination that the motion of the first object indicates that the first object will interfere with the operation of the first element during the second time period, performing an action that avoids the interference;

wherein determining whether the motion of the first object during the first time period indicates that the first object will interfere with the operation of the first element during the second time period comprises:

determining an estimated trajectory of the first object during the first time period;

in accordance with a determination that the estimated trajectory of the first object indicates that the first object will reach the first space during the second time period, determining that the first object will interfere with the operation of the first element;

in accordance with a determination that the estimated trajectory of the first object indicates that the first object will not reach the first space, determining that the first object will not interfere with the operation of the first element; and in accordance with a determination that the second time period is greater than a predetermined threshold time after the first time period, forgoing determining that the first object will interfere with the operation of the first element.

18. A vehicle comprising:
a first camera;
one or more processors coupled to the first camera;
a door actuator coupled to the one or more processors;
a first element configured to open, using the door actuator, into a first space external to the vehicle; and
a memory including instructions, which when executed by the one or more processors, cause the one or more processors to perform a method comprising:

receiving image data from the first camera, the image data indicative of motion of a first object during a first time period, the first object located outside of the first space;

determining whether the motion of the first object during the first time period indicates that the first object will interfere with operation of the first element during a second time period, after the first time period; and in accordance with a determination that the motion of the first object indicates that the first object will interfere with the operation of the first element during the second time period, performing an action that avoids the interference;

wherein determining whether the motion of the first object during the first time period indicates that the first object will interfere with the operation of the first element during the second time period comprises:

determining an estimated trajectory of the first object during the first time period;

in accordance with a determination that the estimated trajectory of the first object indicates that the first object will reach the first space during the second time period, determining that the first object will interfere with the operation of the first element;

in accordance with a determination that the estimated trajectory of the first object indicates that the first object will not reach the first space, determining that the first object will not interfere with the operation of the first element; and in accordance with a determination that the second time period is greater than a predetermined threshold time after the first time period, forgoing determining that the first object will interfere with the operation of the first element.

* * * * *